United States Patent
Lee

(10) Patent No.: US 8,186,175 B2
(45) Date of Patent: May 29, 2012

(54) STRUCTURAL IMPROVEMENT FOR ELECTRIC ENERGY SAVING EQUIPMENT

(76) Inventor: Te-Shou Lee, Xinzhuang (TW)

( * ) Notice: Subject to any disclaimer, the term of this patent is extended or adjusted under 35 U.S.C. 154(b) by 485 days.

(21) Appl. No.: 12/461,399

(22) Filed: Aug. 11, 2009

(65) Prior Publication Data

US 2011/0036116 A1 Feb. 17, 2011

(51) Int. Cl.
F25B 13/00 (2006.01)
(52) U.S. Cl. ......................... 62/324.1; 62/509
(58) Field of Classification Search ................ 62/324.1, 62/470, 475, 509, 238.7, 160; 137/246.16, 137/329.3, 511, 601.2
See application file for complete search history.

(56) References Cited

U.S. PATENT DOCUMENTS

| | | | | |
|---|---|---|---|---|
| 5,009,078 A * | 4/1991 | Ohkoshi et al. | ................. | 62/160 |
| 5,050,396 A * | 9/1991 | Ohkoshi et al. | ................. | 62/160 |
| 5,123,255 A * | 6/1992 | Ohizumi | ..................... | 62/175 |
| 5,161,386 A * | 11/1992 | Higuchi | ..................... | 62/160 |
| 5,237,833 A * | 8/1993 | Hayashida et al. | ........... | 62/324.6 |
| 5,297,396 A * | 3/1994 | Kitamoto | ..................... | 62/175 |
| 5,309,733 A * | 5/1994 | Hayashida et al. | ........... | 62/278 |
| 5,345,780 A * | 9/1994 | Aaron et al. | ................. | 62/324.6 |
| 5,901,563 A * | 5/1999 | Yarbrough et al. | ........... | 62/238.7 |
| 5,996,360 A * | 12/1999 | Tanaka et al. | ................ | 62/160 |
| 6,065,302 A * | 5/2000 | Sada et al. | ................. | 62/324.4 |
| 6,199,399 B1 * | 3/2001 | Voorhis | ..................... | 62/324.6 |
| 6,253,564 B1 * | 7/2001 | Yarbrough et al. | ........... | 62/238.7 |
| 6,279,330 B1 * | 8/2001 | Ueno et al. | ..................... | 62/77 |
| 6,286,322 B1 * | 9/2001 | Vogel et al. | ..................... | 62/81 |
| 6,668,569 B1 * | 12/2003 | Jin | ................................. | 62/197 |
| 6,679,321 B2 * | 1/2004 | Jin | ................................. | 165/236 |
| 6,691,924 B1 * | 2/2004 | Vestergaard et al. | ........ | 236/92 B |
| 6,779,356 B2 * | 8/2004 | Lee et al. | ..................... | 62/204 |
| 6,874,694 B2 * | 4/2005 | Saitoh et al. | ................ | 237/2 B |

* cited by examiner

*Primary Examiner* — Mohammad Ali
(74) *Attorney, Agent, or Firm* — Bacon & Thomas, PLLC

(57) ABSTRACT

An electric energy saving equipment comprising a coolant compressor, a heat pump, a four way valve, a heating/cooling heat exchanger, an expansion valve, four check valves, an indoor unit of split type air conditioner and piping system for assembling the aforesaid parts and components, which structural improvement for electric energy saving is employed the four check valves to control the coolant to flow or to stop flow in different pipes and then to form an electric energy saving equipment possessing the function of waste heat recovery, house cooling, house heating, indoor air conditioning, indoor heating and dehumidification.

4 Claims, 5 Drawing Sheets

STRUCTURAL IMPROVEMENT FOR ELECTRIC ENERGY SAVING EQUIPMENT

BACKGROUND OF THE INVENTION

1. Field of the Invention

The invention relates to an electric energy saving equipment, more particularly to a structural improvement for electric energy saving equipment employing four check valves to control the flow direction of coolant for achieving the function of waste heat recovery, house heating, house cooling, indoor heating, air conditioning and dehumidification.

2. Description of Prior Art

The structure of a known multi-functional energy saving equipment 10 is shown in FIG. 1 which includes a coolant compressor 30, a heat pump 40, a heating/cooling heat exchanger 50, a four way valve 60, two expansion valves E1 and E2, five solenoid valves S1, S2, S3, S4 and S5, an indoor unit 80 of split type air conditioner and piping system P1-P10 for connecting the aforementioned parts and components to enable the energy saving equipment 10 to provide the function of waste heat recovery, house heating, house cooling as well as indoor heating, indoor air conditioning and indoor dehumidification by incorporating with an indoor unit 80 of split type air conditioner.

Shown in FIG. 1 when the indoor unit 80 of split type air conditioner in room 90 starts to operate in air conditioning mode the solenoid valves S1, S3 and S5 mounted on coolant pip are closed to stop the coolant to enter the fifth pipe P5, the ninth pipe P9 and the tenth pipe P10, but the solenoid valve S2 can be set in a state to allow the coolant to flow in the seventh pipe P7, and solenoid valve S4 can allow the coolant to flow in the sixth pipe P6 and the fourth Pipe P4, while the four way valve 60 is set in a state that its second port B is for the coolant to flow in, and the fourth port D is for the coolant to flow out.

While in this operation mode the coolant is compressed by coolant compressor 30 to become high pressure and high temperature of gas phase state which then flows through the first pipe P1 to heat pump 40 for waste heat recovery and cooling of coolant that makes the coolant to become high pressure but low temperature of liquid phase state. An oil separator L1 may be mounted on the first pipe P1 for prevent the cooling oil of coolant compressor 30 from entering the indoor unit 80 of split type air conditioner inside room 90. Then the high pressure and low temperature of liquid phase coolant flowing out from the second pipe P2 flows into the first port A and passes through the third port C of the four way valve 60 and the eighth pipe P8 to enter the heating/cooling heat exchanger 50 for heat dissipation. After passing through heating/cooling heat exchanger 50 the coolant is in a state of high pressure but even lower temperature of liquid phase state, and continues to pass the expansion valve E2 on the seventh pipe P7 to reduce its pressure, then the coolant is in a state of low temperature and low pressure of gas phase state which continues to enter into the coolant pipe of the indoor unit of split type air conditioner for heat absorption, and then the state of the coolant is shifted to low pressure but high temperature of gas phase state, and the coolant will flow passing through the sixth pipe P6, the fourth pipe P4, the second port B and the fourth port D of the four way valve 60 and the third pipe P3 to go back to coolant compressor 30 for cyclic use. And, a liquid/gas separator L3 may be mounted on the third pipe P3 to prevent the liquid phase coolant from entering the compressor 30.

By applying the coolant operation cycle as mentioned above, the dehumidification or house heating effect can be achieved in a room where the heating/cooling heat exchanger 50 is installed, while the air conditioning effect can be achieved inside the room 90 where the indoor unit 80 of split type air conditioner is installed.

The principle of the aforesaid coolant operation includes the heat dissipation is carried out by the heating/cooling heat exchanger 50 which enables the air surrounding the coolant pipe of the dual function heat exchanger 50 to absorb the heat dissipated by the coolant and to let the air raise its temperature, and then the high temperature of air is distributed over the space inside the room by blower 51 to achieve the effect of dehumidification or house heating; and at the same time, the heat absorption is also carried out by the indoor unit 80 which absorbs heat from the surrounding air. After the heat of the surrounding air is absorbed by the low temperature coolant flowing through the coolant pipe of the indoor unit 80 of split type air conditioner, the air is cooled down, and is distributed over the space inside room 90 by blower of the indoor unit 80 to achieve the effect of air conditioning.

As shown in FIG. 2 when the indoor unit 80 of split type air conditioner in room 90 starts to operate in heating or dehumidification mode, the solenoid valve S2 and S4 on coolant pipe will allow coolant to flow into the seventh pipe P7 and the sixth pipe P6 while the solenoid valve S3 is in a state to allow the coolant to flow through the ninth pipe P9 and the solenoid valve S5 and S1 allow the coolant to flow through the tenth pipe P10 and the fifth pipe P5, and at the same time, the third port C of the four way valve 60 is shifted to as the inlet port of coolant.

While in this mode the coolant is compressed by the coolant compressor 30 to become high pressure and high temperature of gas phase state, and then flows through the first pipe P1 to heat pump 40 for waste heat recovery. The coolant is then cooled down to change its state in high pressure and low temperature of liquid phase state, and the liquid phase state of coolant flowing out from the second pipe P2 will flow directly through the ninth pipe P9 to the indoor unit 80 of split type air conditioner for heat dissipation to enable the coolant to be further cooled down to an even lower temperature, and then the coolant will pass through the tenth pipe P10 and the expansion valve E1 on the fifth pipe P5 for pressure reduction, then the coolant in low pressure and low temperature of gas phase state flows through the heating/cooling heat exchanger 50 for heat absorption and changing its state to low pressure and high temperature of gas phase state, further the coolant will flow through the eighth pipe P8, the third port C and the fourth port D of the four way valve 60, and the third pipe P3 to return to the coolant compressor 30 for cyclic use.

By applying the coolant operation cycle as mentioned above, the house cooling effect can be achieved in a room where the heating/cooling heat exchanger 50 is installed, the dehumidification or house heating effect can be achieved inside the room 90 where the indoor unit 80 of split type air conditioner is installed.

The principle of the above-mentioned application includes the heat absorption is carried out by the heating/cooling heat exchanger 50 which significantly decreases the temperature of the air surrounding the coolant pipe, and the low temperature of air is then distributed over the space inside the room by flower 51 to achieve the house cooling effect; however, at the same time the indoor unit 80 of split type air conditioner undergoes heat dissipation that raises the temperature of air surrounding the coolant pipe of the indoor unit 80 due to heat absorption by air from coolant. The hot air is then distributed over the space inside the room 90 to achieve house heating and dehumidification effect.

However, the above-mentioned equipment 10 still has drawback in saving electric energy due to as many as 5 solenoid valves used in the equipment which needs to be improved.

SUMMARY OF THE INVENTION

In view of the above, the main purpose of the present invention is to provide an electric energy saving equipment not only for waste heat recovery, house cooling, house heating, but also for indoor air conditioning, indoor heating and humidification by employing a indoor unit of split type air conditioner, the key feature of the electric energy saving equipment of the present invention is that for achieving the effect of electric energy saving the solenoid valves due to being electric energy consumptive parts are no longer used and are replaced with four check valves as energy saving means to control the flow direction of coolant.

The another purpose of the present invention is to provide an electric energy saving equipment comprising a coolant compressor, a heat pump, a four way valves, a heating/cooling heat exchanger, an expansion valve, four check valves, an indoor unit of split type air conditioner and pipes for connecting the aforesaid parts and components, characterized in that the four check valves are arranged to control the flow of coolant in pipes for electric energy saving so that the coolant may continue to flow or stop to flow in relevant pipes depending on the arrangement and the operation of the four check valves. As a result, in combination of employing the four way valve and the four check valves to control the flow direction of coolant in pipes, the electric energy saving equipment of the invention shall achieve the effect of electric energy saving not only in application of waste heat recovery, house heating and house cooling, but also in application of indoor air conditioning, heating and dehumidification by incorporation with an indoor unit of split type air conditioner.

DETAILED DESCRIPTION OF THE PREFERRED EMBODIMENT

Figure 3:
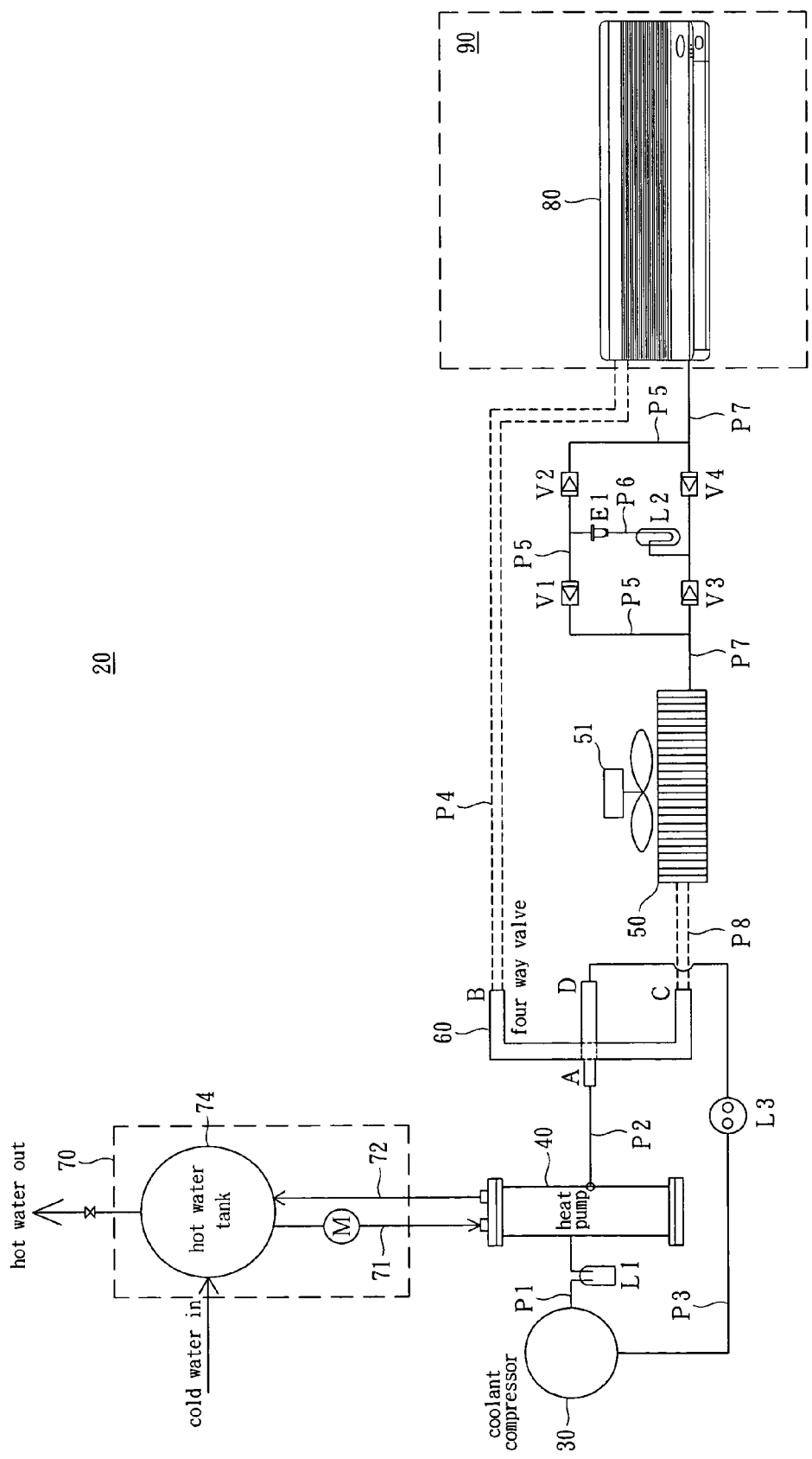
FIG. 3 is a schematic drawing of an electric energy saving equipment of the present invention to illustrate the equipment has four check valves arranged to control the flow of coolant in pipes for electric energy saving.

As illustrated in FIG. 3, the present invention discloses an electric energy saving equipment 20 comprising no solenoid valves of electric energy consumptive parts to provide the function of waste heat recovery, house heating, house cooling, indoor air conditioning, indoor heating and dehumidification, so that the equipment 20 of the present invention has the advantage of energy saving.

The structure of the equipment 20 of the present invention includes a coolant compressor 30, a heat pump 40, a heating/cooling heat exchanger 50, a four way valve 60, an expansion valve E1, four check valves V1, V2, V3 and V4, an indoor unit 80 of split type air conditioner and pipes P1-P8 for connecting the aforesaid parts and components.

A first pipe P1 of coolant compressor 30 is an outlet pipe of coolant compressed by the coolant compressor 30, and a third pipe P3 on which a liquid/gas separator L3 is installed is the inlet pipe of coolant returned to the coolant compressor 30. An oil separator L1 may be selectively installed on the first pipe P1 to prevent the cooling oil of the coolant compressor 30 from entering the indoor unit 80 of split type air conditioner.

The heat pump 40 is a device for heat exchange used for waste heat recovery to have cool water heated up to hot water and then stored to a hot water tank 74 of hot water supply equipment 70. The first pipe P1 is for connecting the heat pump 40 and the coolant compressor 30, and a second pipe P2 forms an outlet coolant pipe of the heat pump 40, so that the coolant after compressed by the coolant compressor 30 will be in a state of high temperature and high pressure of gas phase state and then flow out from the first pipe P1 to heat pump 40 for dissipation of heat, and, in the place of heat pump 40, the coolant due to heat exchange is cooled down to a state of high pressure and low temperature of liquid phase state and then flows out from the second pipe P2.

The four way valve 60 is a flow direction diverter valve for controlling and shifting the direction of coolant. The first port D1 of the four way valve 60 is an inlet port of the coolant in normal condition, in addition to being connected to the second pipe P2 of the heat pump 40, the first port D1 can be used as a control means to allow or stop the coolant to enter the valve 60. The fourth port D4 of the four way valve 60 is an outlet port of the coolant in normal condition and is connected to the third pipe P3 of the coolant compressor 30. The second port D2 and the third port D3 of the four way valve 60 are for shifting the flow direction of the coolant, the two ports D2 and D3 can be set as either the inlet port or the outlet port of the coolant, and can be connected to a fourth pip P4 and a eighth pip P8 respectively. The other end of the fourth pipe P4 is connected to one end of the coolant pipe of the indoor unit 80 of split type air conditioner.

The heating/cooling heat exchanger 50 has the function as a condenser or as an evaporator which can enable the coolant to undergo a heat dissipation process or a heat absorption process. When the coolant in a state of high temperature and low pressure of liquid phase state passes through the heating/cooling heat exchanger 50, the coolant undergoes a condensing process to dissipate heat; whereas when the coolant in a state of low pressure and low temperature of gas phase state passes through the heating/cooling heat exchanger 50, the coolant will undergo an evaporation process to absorb heat.

The indoor unit 80 of split type air conditioner is an indoor unit of variable frequency type of air conditioner or fixed frequency type of air conditioner installed inside a room 90. The indoor unit 80 has coolant pipe (not shown in the drawing). When the coolant in state of low pressure and low temperature of gas phase state passes through the coolant pipe inside the indoor unit 80, the coolant will undergo an evaporation process to absorb heat from the surrounding air, the result is that the indoor unit 80 shall send out cool air to the space inside room 90; whereas when the coolant in a state of high temperature and low pressure of liquid phase state passes through the coolant pipe inside the indoor unit 80, the coolant will undergo a condensing process to dissipate heat to the surrounding air, the result is that the indoor unit 80 shall send out send out warm air to the space inside room 90.

The eighth pipe P8 of the heating/cooling heat exchanger 50 is connected to the third port D3 of the four way valve 60, and a seventh pipe P7 is connected to the fifth pipe P5 to form parallel connection. The two pipes P7 and P5 are connected to one end of the coolant pipe of the indoor unit 80 to form parallel connection.

The fifth pipe P5 is a coolant inlet pipe of the heating/cooling heat exchanger 50 and further has a first check valve V1 and a check valve V2 installed thereon, but the flow direction of these two check valves V1 and V2 are set to opposite to each other.

In contrast with the fifth pipe P5, the seventh pipe P7 is an outlet pipe of the coolant of the heating/cooling heat exchanger 50 and has a third check valve V3 and a fourth check valve V4 installed thereon. Also, the flow direction of these two check valves V3 and V4 are set to opposite to each other, but the third check valve V3 on the seventh pipe P7 and the second check valve V2 on the fifth pipe P5 are in the same flow direction. Similarly, the fourth check valve V4 on the seventh pipe P7 and the first check valve v1 on the fifth pipe P5 are set to have the same flow direction.

One end of a sixth pipe P6 is in parallel connected to the fifth pipe P5 at the place located between the first check valve V1 and the second check valve V2 installed on the fifth pipe P5; the other end of the sixth pipe P6 is in parallel connected to the seventh pipe P7 at the place located between the third check valve v3 and the fourth check valve V4 installed on the seventh pipe P7.

The sixth pipe P6 has an expansion valve E1 for the purpose of changing the coolant from in state of high pressure and low temperature of liquid phase state to in state of low pressure and low temperature of gas phase state. The purpose of having the pressure of the coolant lowered down in state of low pressure and low temperature of gas phase state is that the coolant shall undergo an evaporation process for absorption of heat when the coolant passes through the heating/cooling heat exchanger 50 or the indoor unit 80 of split type air conditioner.

A high pressure liquid accumulator L2 may be installed on the sixth pipe P6 for receiving the coolant in state of high pressure and low temperature of liquid phase state and removing the impurity and water by strainer inside the high measure accumulator L2, so that the coolant when flowing out from the high pressure accumulator L2 will pass through expansion valve E1 to decrease the pressure.

Room Heating and Indoor Air Conditioning Function

Figure 4:
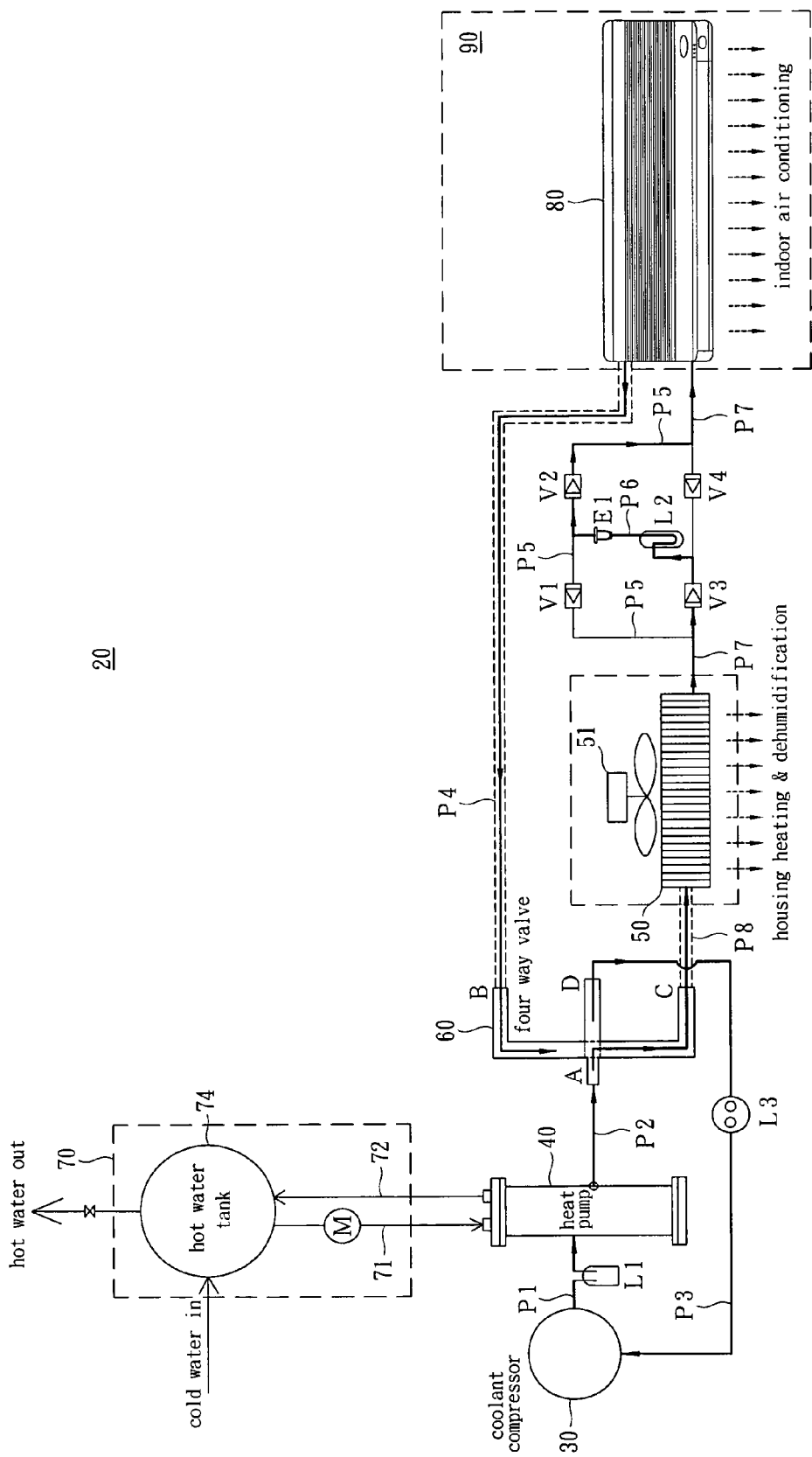
FIG. 4 is an illustrated drawing of FIG. 3 to illustrate the operation of coolant flowed in pipes when the equipment is to provide the function of house heating and indoor air conditioning.

As shown in FIG. 4, when a coolant circulating loop of the electric energy saving equipment 20 of the invention is constituted by the first pipe P1, the second pipe P2, the eighth pipe P8, the seventh pipe P7, the sixth pipe P6, the fifth pipe P5, the fourth pipe P4 and the third pipe P3 together, the electric energy saving equipment 20 of the invention can provide the function of house heating, dehumidification and indoor air conditioning. At the moment, the indoor unit 80 of split type air conditioner installed inside room 90 is in operation state, and the four way valve 60 is shifted to having the second port D2 as the inlet of coolant and the third port D3 as the outlet of coolant.

And, the manner of coolant operation is in such a way that the coolant is compressed by the coolant compressor 30 to change its state in high pressure and high temperature of gas phase state, the coolant is then followed to send to the heat pump 40 for waste heat recovery and due to dissipation of heat is cooled to change its state in high pressure and low temperature of liquid phase state, after flowing out from the second pipe P2, the coolant passes through the first port D1 and the third port D3 of the four way valve 60 and the eighth pipe P8, and then further enters into the heating/cooling heat exchanger 50 for dissipation of heat to change its state in high pressure and much lower temperature of liquid phase state. Meanwhile, the first check valve V1 on the fifth pipe P5 and the fourth check valve V4 on the seventh pipe P7 will stop the coolant to flow into the pipes, but the third check valve V3 on the seventh pipe P7 and the second check valve V2 on the fifth pipe P5 allow the coolant to flow into the pipes.

After flowing out from the heating/cooling heat exchanger 50, the coolant shall flow through the third check valve V3 on the seventh pipe P7 and sixth pipe P66, and the coolant further reduces its pressure when passing through the expansion valve E1 on the sixth pipe P6. As a result, the coolant changes its state in low pressure and low temperature of gas phase state. Subsequently, the coolant passes the second check valve V2 on the fifth pipe P5 and enters into the coolant pipe of the indoor unit 80 of split type air conditioner to undergo an evaporation process for absorption of heat and at the same moment change its state in low pressure and high temperature of gas phase state. After flowing out from the indoor unit 80, the coolant passes through the fourth pipe P4, the second port D2 and the fourth port D4 of the four way valve 60 and the third pipe P3 to return to the coolant compressor 30 for cyclic use.

Due to the coolant undergoing a condensing process for dissipation of heat in the heating/cooling heat exchanger 50, the air surrounding the coolant pipe of the heating/cooling heat exchanger 50 absorbs the heat dissipated by the coolant and raises its temperature to the level of warm air, so that the place where the heating/cooling heat exchanger 50 is installed achieves the effect of dehumidification or house heating.

And, when the indoor unit 80 of split type air conditioner is in operation state, the air surrounding the coolant pipe of the indoor unit 80 transfers heat to the coolant due to the coolant undergoing an evaporation process for absorption of heat, and then the air reduce its temperature to the level of cold air, so that the room 90 where the indoor unit 80 of split type air conditioner is installed achieve the effect of air conditioning.

House Cooling and Indoor Heating Function

Figure 5:
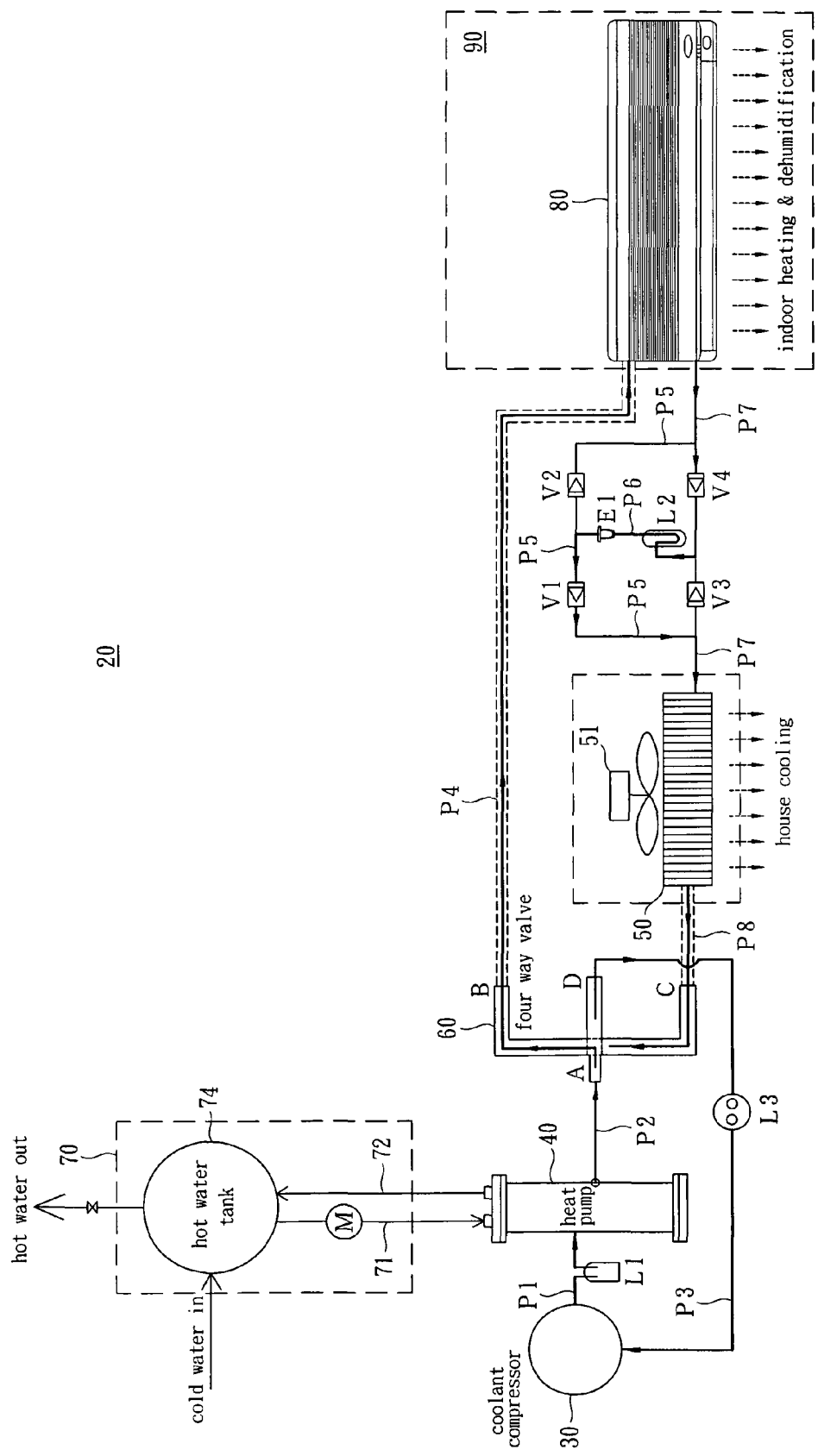
FIG. 5 is another illustrated drawing of FIG. 3 to illustrate the operation of coolant flowed in pipes when the equipment is to provide the function of house cooling and indoor heating.

As shown in FIG. 5, when a coolant circulating loop of the electric energy saving equipment 20 of the invention is constituted by the first pipe P1, the second pipe P2, the fourth pipe P4, the fifth pipe P5, the sixth pipe P6, the seventh pipe P7, the eighth pipe P8 and the third pipe P3 together, the electric energy saving equipment 20 of the invention can provide the function of house cooling and indoor heating or dehumidification. At the moment, the indoor unit 80 of split type air conditioner installed inside room 90 is in operation state, and the four way valve 60 is shifted to having the second port D2 as the outlet of coolant and the third port D3 as the inlet of coolant.

And, the manner of coolant operation is in such a way that the coolant is compressed by the coolant compressor 30 to change its state in of high pressure and high temperature of gas phase state, the coolant is then followed to send to the heat pump 40 for waste heat recovery and due to dissipate heat is cooled to change its state in high pressure and low temperature of liquid phase state, after flowing out from the second pipe P2, the coolant passes through the first port D1 and the second port D2 of the four way valve 60 and the fourth pipe P4, and then further enters into the indoor unit 80 for dissipation of heat to change its state in high pressure and much lower temperature of liquid phase state. Meanwhile, the second check valve V2 on the fifth pipe P5 and the third check valve V3 on the seventh pipe P7 stop the coolant to flow into the pipes, but the fourth check valve V4 on the seventh pipe P7 and the first check valve V1 on the fifth pipe P5 allow the coolant to flow into the pipes.

After flowing out from the indoor unit 80, the coolant shall flow through the fourth check valve V4 on the seventh pipe P7 and sixth pipe P6, and the coolant further reduces its pressure when passing through the expansion valve E1 on the sixth pipe P6. As a result, the coolant changes its state in low pressure and low temperature of gas phase state. Subsequently, the coolant passes through the first valve V1 on the fifth pipe P5 and enters into the heating/cooling heat exchanger 50 to undergo an evaporation process for absorption of heat and at the same moment change its state in low pressure and high temperature of gas phase state. After flowing out from the heating/cooling heat exchanger 50, the coolant passes through the eighth pipe P8, the third port D3 and the fourth port D4 of the four way valve 60 and the third pipe P3 to return to the coolant compressor 30 for cyclic use.

Due to the coolant undergoing an evaporation process for absorption of heat in the heating/cooling heat exchanger 50, the air surrounding the coolant pipe of the heating/cooling heat exchanger 50 transfers heat to the coolant and lowers its temperature to the level of cold air, so that the place where the heating/cooling heat exchanger 50 is installed achieves the effect of house cooling.

And, when the indoor unit 80 of split type air conditioner is in operation state, the air surrounding the coolant pipe of the indoor unit 80 absorbs the heat dissipated by the coolant due to the coolant undergoing a condensing process for dissipation of heat, and then the air raises its temperature to the level of warm air, so that the room 90 where the indoor unit 80 of split type air conditioner is installed achieve the effect of dehumidification or house heating.

Waste Heat Recovery Function

Shown in FIGS. 4 and 5, the hot water supply equipment 70 can be incorporated to the electric energy saving equipment 20 of the invention for recovering energy and supplying hot water. In order to recover the waste heat dissipated by the heat pump 40, a cold water inlet pipe 71 and a hot water outlet pipe 72 must be connected to the heat pump 40. The cold water through cold water pipe 71 is pumped into the heat pump 40 by water pump M and undergoes a heat-exchange process with the coolant in state of high pressure and high temperature coolant of gas phase state to become hot water which through hot water outlet pipe 72 is then sent to a hot water storage tank 74 for storage, and then the hot water can be supplied from the hot water storage tank 74 for usage at any time.

Structural Improvement for Energy Saving

Based on the afore-mentioned description, the arrangement of the four check valves V1, V2, V3 and V4 of the electric energy saving equipment 20 of the invention has proved to be effective in achieving the function of waste heat recovery, house cooling, house heating, indoor air conditioning and indoor heating and humidification.

Besides, for further proving the energy saving equipment 20 of the invention using check valves V1, V2, V3 and V4 to control the coolant to be flowed in pipes has more effective function of electric energy saving than that of known multi-functional energy saving equipment 10 shown in FIG. 1 using solenoid valve to do the same matter, the test result of electricity consumption of these two equipments is shown in the following table 1.

TABLE 1

Figure 1:
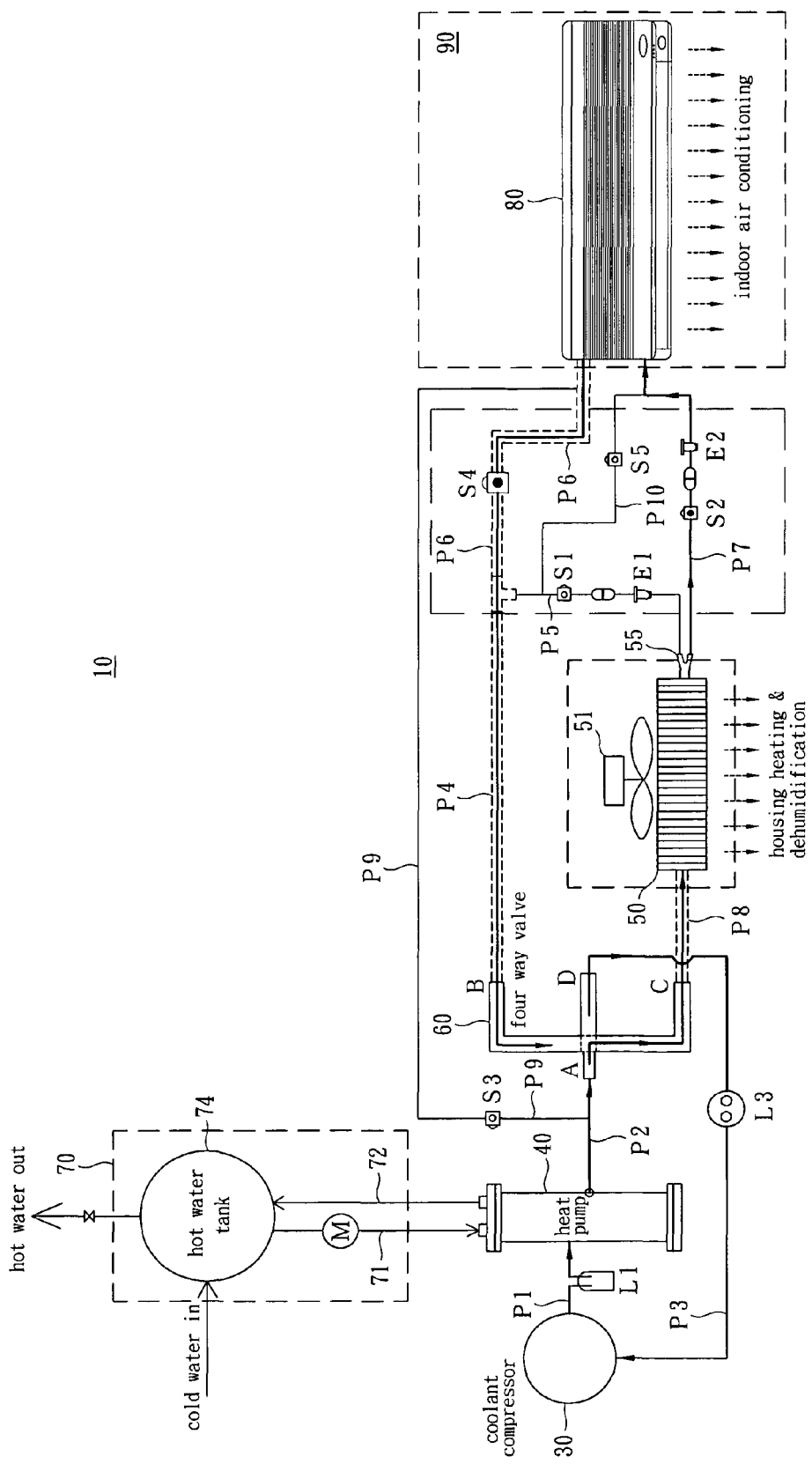
FIG. 1 is a schematic drawing of a known multi-functional energy saving equipment to illustrate the operation of coolant flowed in pipes when the equipment is to provide the function of housing heating and indoor air conditioning.
Figure 2:
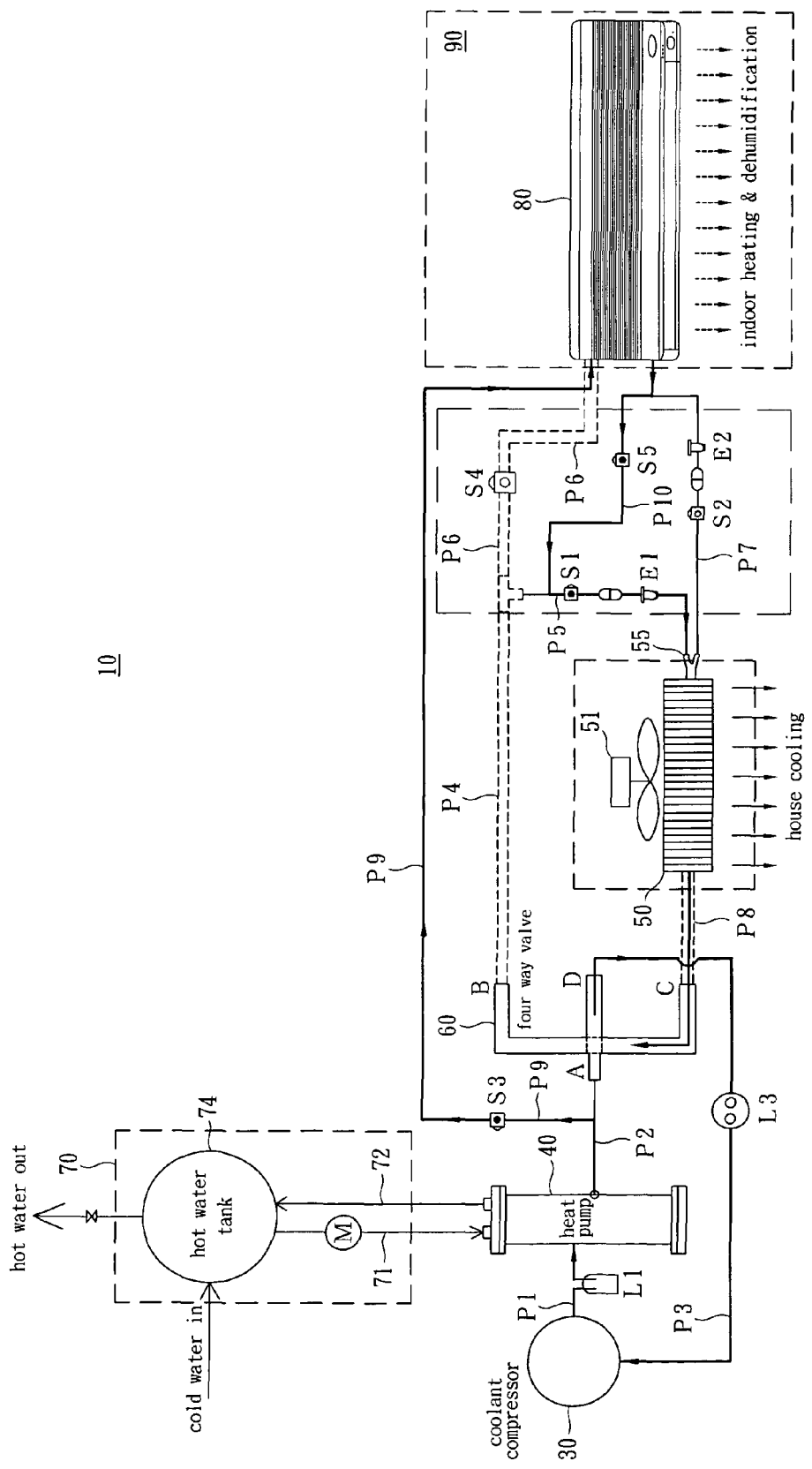
FIG. 2 is also a schematic drawing of the known multi-functional energy saving equipment shown in FIG. 1 to illustrate the operation of coolant flowed in pipes when the equipment is to provide the function of housing cooling and indoor heating.

| Operation function | Test Condition | The energy saving equipment of the invention | The known energy saving equipment shown in FIG. 1 |
|---|---|---|---|
| House heating and indoor air conditioning | Hot water temperature from waste heat recovery | 54° C. | 50° C. |
| | High pressure of coolant | 155 psi | 240 psi |
| | Low pressure of coolant | 62 psi | 68 psi |
| | Air temperature from indoor unit | 9° C. | 15.5° C. |
| | Operation current of coolant compressor | 8.4 A | 13.8 A |
| House cooling and indoor heating | Hot water temperature from waste heat recovery | 53° C. | 50° C. |
| | High pressure of coolant | 292 psi | 310 psi |
| | Low pressure of coolant | 64 psi | 70 psi |
| | Air temperature from heating/cooling heat exchanger | 10° C. | 11° C. |
| | Operation current of coolant compressor | 11.8 A | 16.8 A |

Conclusion

1. From the result of Table 1, when undergoing the indoor heating and air conditioning function, the operation current of the coolant compressor 30 of the energy saving equipment 20 of this invention is 8.4 Ampere and the temperature of cold air outlet from the indoor unit 80 is 9° C.

In contrast with the known multi-functional energy saving equipment shown in FIG. 1, the operation current of the coolant compressor 30 of the known multi-functional energy saving equipment is 13.8 Ampere and the temperature of cold air outlet from the indoor unit 80 of the known multi-functional energy saving equipment is 15.5° C.

2. From the result of Table 1, when undergoing the house cooling and indoor heating function, the operation current of the coolant compressor 30 of the energy saving equipment 20 of this invention is 11.8 Ampere and the temperature of cold air outlet from the heating/cooling heat exchanger 50 is 10° C.

In contrast with the known multi-functional energy saving equipment shown in FIG. 1, the operation current of the coolant compressor 30 of the known multi-functional energy saving equipment is 16.8 Ampere and the temperature of cold air outlet from the heating/cooling heat exchanger 50 of the known multi-functional energy saving equipment is 11° C.

3. As a result, the test result in Table 1 shows that in application of four check valves V1, V2, V3 and V4 assembled in the energy saving equipment 20 of the present invention can effectively achieve the function of electric energy saving.

What is claimed is:

1. An electric energy saving equipment comprising a coolant compressor, a heat pump, a four way valve, a heating/cooling heat exchanger, an expansion valve E1, four check valves (V1, V2, V3, V4), an indoor unit of split type air conditioner and pipes (P1-P8) for connecting the parts and components, characterized in that a first pipe P1 connected to the coolant compressor as a coolant outlet pipe, and connected to the heat pump as a coolant inlet pipe;

a second pipe P2 the heat pump as a coolant outlet pipe;

a third pipe P3 connected to the coolant compressor as a coolant inlet pipe;

the four way valve is a flow direction diverter valve having four connecting ports D1-D4 of which the first port D1 is connected to second pipe P2 of the heat pump; the fourth port D4 is connected to the third pipe P3; the second port D2 for shifting the direction of coolant flow is connected to the indoor unit of split type air conditioner through a fourth pipe P4 and the third port D3 for shifting the direction of coolant flow is connected to the heating/cooling heat exchanger through a eighth pipe P8;

the heating/cooling heat exchanger having functions of condensing and evaporation is connected to the indoor unit of split type air conditioner through a fifth pipe P5 and a seventh pipe P7 mutually connected in parallel;

the fifth pipe P5 has a first check valve V1 and a second check valve V2 which are arranged to have their flow direction opposite to each other;

the seventh pipe P7 has a third check valve V3 and a fourth check valve V4 which, in addition to having their flow direction arranged opposite to each other, also have the third check valve V3 on the seventh pipe P7 arranged in the same flow direction as the second check valve V2 on the fifth pipe P5 and have the fourth check valve V4 on the seventh pipe P7 arranged in the same flow direction as the first valve V1 on the fifth pipe P5;

a sixth pipe P6 has an expansion valve E1, which one end is in parallel connected to the fifth pipe P5 at the point between the first check valve V1 and the second check valve V2 on the fifth pipe P5, and the other end is in parallel connected to the seventh pipe P7 at the point between the third check valve v3 and the fourth check valve V4 on the seventh pipe P7.

2. The electric energy saving equipment as described in claim 1, wherein the indoor unit of split type air conditioner is a frequency-changing type indoor unit or a frequency fixed type indoor unit.

3. The electric energy saving equipment as described in claim 2, wherein an oil separator L1 is installed on the first pipe P1.

4. The electric energy saving equipment as described in claim 2, wherein a high pressure liquid accumulator L2 is installed on the sixth pipe P6 for filtrating the coolant and removing the impurities and water from the coolant.

* * * * *